United States Patent [19]

Bale

[11] 4,281,450
[45] Aug. 4, 1981

[54] METHODS AND APPARATUS FOR INSERTING COILS INTO DYNAMOELECTRIC MACHINE STATOR ASSEMBLIES

[75] Inventor: Richard W. Bale, Fennville, Mich.

[73] Assignee: General Electric Company, Fort Wayne, Ind.

[21] Appl. No.: 86,794

[22] Filed: Oct. 22, 1979

[51] Int. Cl.³ .............................................. H02K 15/06
[52] U.S. Cl. ........................................ 29/596; 29/736
[58] Field of Search ................. 29/596, 606, 732, 734, 29/736

[56] References Cited

U.S. PATENT DOCUMENTS 2,934,099  4/1960  Mason ................................. 29/732 X Primary Examiner—Carl E. Hall
Attorney, Agent, or Firm—Ralph E. Krisher, Jr.

[57] ABSTRACT

Methods and apparatus are disclosed for relatively positioning coils within winding coil groups for a magnetic core to facilitate insertion of the coil group into axially extending slots of the magnetic core of a stator assembly.

One method that is disclosed involves intercepting the end turn portion of a first relatively large coil having a lateral position outward relative to the end turn portion of a second relatively smaller coil with yieldable means as the coils are moved toward a magnetic core for subsequent insertion of the first and second coils into respective axially extending slots of the magnetic core. The arrangement of the first coil end turns inside of the second coil reduces the interengagement pressure between the first coil and the second coil normally occurring during the insertion of the coils into their respective slots of the magnetic core.

Apparatus is illustrated for inserting one or more windings into a magnetic core of a stator assembly. The apparatus includes yieldable means that intercept end turn portions of one coil of a winding coil group as the winding is moved toward the magnetic core for subsequent insertion. The intercepted end turn portions are displaced by the yieldable means to a position inside end turn segments of a second coil of the winding. Prior to interception, the end turns of the first coil are laterally outside of the end turns of the second coil.

7 Claims, 10 Drawing Figures

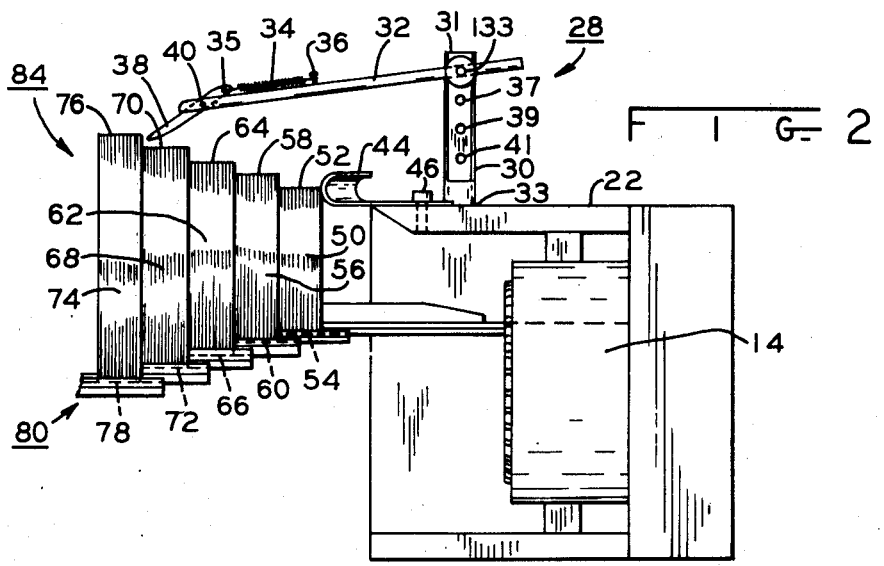
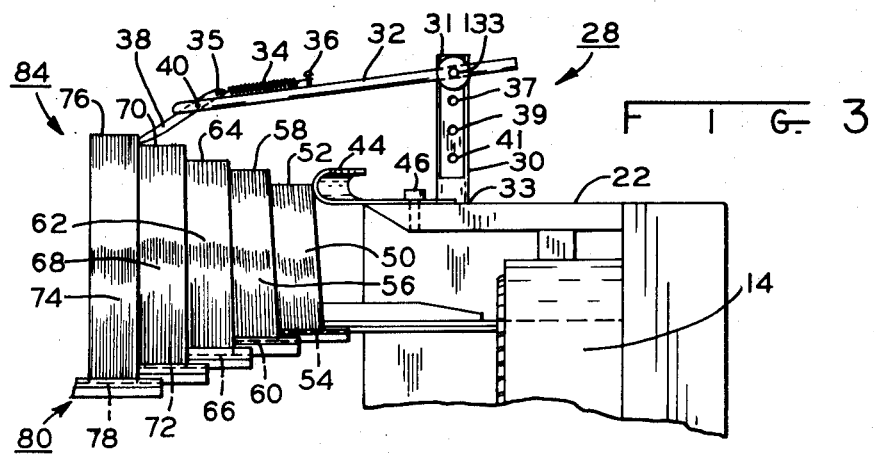
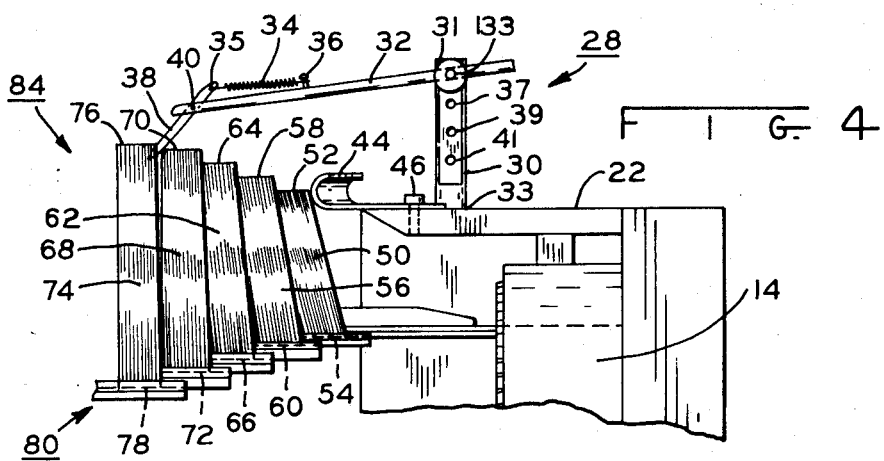

METHODS AND APPARATUS FOR INSERTING COILS INTO DYNAMOELECTRIC MACHINE STATOR ASSEMBLIES

BACKGROUND OF THE INVENTION

The present invention relates generally to dynamoelectric machines and more particularly to improved methods and apparatus for inserting one or more windings into axially extending slots of a magnetic core of a dynamoelectric machine stator assembly.

Currently employed apparatus provide for automatic insertion of windings into the slots of a magnetic core. Exemplary automated apparatus for axial insertion of coils of windings into magnetic cores include U.S. Pat. Nos. 3,672,027 and 3,722,063 (Arnold), 3,579,818 (Arnold et al), 3,973,601 (Arnold et al), 2,432,267 (Adamson), 2,934,099 (Mason), 3,324,536 (Hill), 2,836,204 (Mason), and 3,528,170 (Duff et al); and U.S. patent application Ser. No. 14,538 (Fooyontphanich et al) filed Feb. 23, 1979. The entire disclosures of these patents and the patent application are incorporated herein by reference.

Windings for dynamoelectric machines generally comprise a plurality of coils formed from a plurality of conductor turns. As an example, one pole of a main winding may typically comprise a coil group of five coils (each comprising a number of turns) that are inserted into axially extending slots of a magnetic core of the dynamoelectric machine. The five coils may be referred to as coils 1, 2, 3, 4, and 5 of a given coil group or pole, with the lower the number designation of the coil the closer the spacing (i.e., the lesser the circumferential span) between the axially extending slots of the magnetic core into which a side portion of each coil is respectively inserted. Also, the larger the number of the coil designation the larger the coil. In any winding injection process it is desirable to complete the injection of the coils so that the coils are evenly spaced axially along the magnetic core. Such even spacing allows the coils to be subsequently evenly folded back against the end faces of the stator core.

The desired axial spacing of the coils is often hindered by two factors; (1) the coils that are inserted into the inner peripheral slots of the magnetic core pull up tight to the bottom face of the core before the remaining coils can be pulled into even axial spacing along the magnetic core, (2) the longer coils are pulled by the shorter coils during the insertion process creating an interengagement pressure between the coils hindering equal distribution of the longer coils. The present invention is primarily concerned with reducing the interengagement pressure created by the shorter coils pulling against the longer coils during insertion. Reducing the interengagement pressure allows for a more even spacing of the coils axially along the magnetic core upon completion of the insertion process. Reducing the interengagement pressure also permits further insertion of coils into stator slots and thereby allows for a longer slot separator wedge to be used.

Accordingly, a general object of the present invention is to provide new and improved methods and apparatus for inserting coils into a dynamoelectric machine stator which allows for a more even axial spacing of the coils within the stator.

A more specific object of the present invention is to provide new and improved methods and apparatus for axially inserting coils into a dynamoelectric machine stator while reducing the interengagement pressure between respective longer and shorter coils as the shorter coils are inserted into their axially extending slots.

A still further object of the present invention is to provide further insertion of the coils into stator slots and thereby allow for the use of a longer slot separator wedge.

SUMMARY OF THE INVENTION

One way of practicing the present invention, in one form thereof, involves intercepting with a yieldable means a first coil of a winding that has been previously established with the use of a coil form. The yieldable means intercepts a portion of a first coil (that ultimately becomes a clearly defined end turn portion) as the first coil is being moved during an axial coil insertion process. The interception of the portion of the first coil with the yieldable means causes the yieldable means to engage and move the intercepted coil portion into a lateral position which is inside of a section of a second coil that had a lateral position inward or inside relative to the first coil before it was intercepted. The arrangement of the end turn portions of the intercepted coil inside of the end turn portions of the second coil reduces an interengagement pressure between the two coils during the insertion of the two coils into their respective axially extending slots of a magnetic core, and allows the two coils to be more evenly spaced axially along the magnetic core of a stator assembly upon completion of the insertion step.

In carrying out the present invention, in another form thereof which may also be used to carry out the above way of practicing the invention, an apparatus is provided having: coil insertion means which carries a plurality of conductor turns forming a plurality of coils of a winding; and a yieldable means. The coils are moved by the coil insertion means in a direction toward and with portions thereof in alignment with, the axially extending slots of a magnetic core. As the coils are being moved the end turn portion of a first coil is intercepted by the yieldable means. The yieldable means engages and moves the intercepted wire inwardly with respect to a second coil having an initial relative position inward of the first coil. The arrangement of the intercepted end turn portion of the first coil inside of end turns of the second coil reduces an interengagement pressure between the first and second coils during the insertion process. Reduction of the interengagement pressure also allows the coils to be more evenly spaced axially along the magnetic core upon the completion of the insertion process.

The yieldable means, in one illustrated form, includes a pivotal means in the form of a pivotal finger attached to a spring tension means, although spring fingers or other deflectable coil deflecting means may be used as the yieldable means. In the illustrated apparatus, the finger is located to intercept and deflect a first coil as the first coil is being moved axially with respect to a magnetic core. The finger deflects the end turn portions of the first coil to a desired position as it is being moved, and then the finger returns to its initial position after the first coil has moved past the finger.

BRIEF DESCRIPTION OF THE DRAWING

FIGS. 2-6 illustrate, respectively, the sequence of a yieldable means intercepting and deflecting end turn portions of a coil;

DESCRIPTION OF THE PREFERRED EMBODIMENTS

Figure 1:
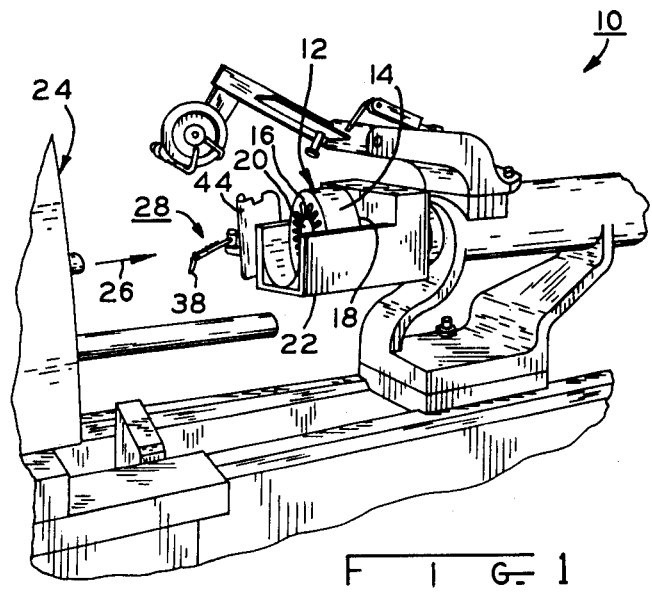
FIG. 1 is a perspective view of an apparatus utilized in practicing the present invention in one form thereof.

FIG. 1 illustrates an apparatus 10 for practicing the present invention in one form thereof. A dynamoelectric machine stator assembly 12, including a slotted magnetic core 14, having spaced apart end faces 16 and 18 and an axially extending core 20, is positioned and supported in a coil receiving position within the apparatus 10 by a supporting means illustrated as cradle 22. The apparatus 10 is of a type substantially the same as the winding and inserting machine, hereinafter to be referred to as a coil transfer winder, illustrated and described in the heretofore mentioned Mason U.S. Pat. No. 2,934,099. In general, a predetermined number of coils, which are to be subsequently inserted into selected slots of the stator assembly 12, are wound on a split stair step type cylindrical member of the coil transfer winder located axially along the apparatus 10 in the area generally denoted by the reference numeral 24. After the coils have been wound, a portion of the cylindrical member is retracted releasing end portions of the wound coils while other end portions of the wound coils remain engaged with a non-retractable portion of the cylindrical member which acts as a coil insertion device. The coil insertion device then moves the coil in an axial direction (illustrated by reference lines 26 in FIG. 1) towards the magnetic core 14 for subsequent into and along axially extending slots of the magnetic core 14.

As will be explained in more detail, a pivotal means 28 is positioned on the cradle base 22 at a predetermined position to intercept a predetermined coil of the plurality of wound coils prior to the insertion of the coils into the axially extending slots of the magnetic core.

Pivotal means 28, shown most clearly in FIG. 3, is mainly comprised of arms 30 and 32, a spring 34, and a finger 38. Arm 30 has one of its ends attached to the cradle 22 at a position 33 via a screw or other suitable means for affixing the arm 30 to the cradle 22. The other end of arm 30 is attached to arm 32 via an adjustable coupler 31. Coupler 31 has a typical diameter of 19.0 mm (0.75 in) and is formed of a rigid material such as cold drawn steel. Coupler 31 has a hole of a sufficient diameter to allow a portion of the arm 32 to be inserted through the hole. A screw 133 or other suitable means is positioned through a top portion of coupler 31, to affix the inserted portion of arm 32 within the opening of coupler 31. A bottom portion (not shown) of coupler 31 is positioned onto a top portion of arm 30. The top portion of arm 32 is milled or ground down to provide a flat surface for mating with the bottom portion of coupler 31. The bottom portion of coupler 31 is connected via a screw or other suitable means, to the flattened top portion of arm 30. The top portion of arm 30 may typically have a plurality of spaced apart openings 37, 39 and 41 into which the bottom portion of coupler 31 mates. It should be noted that when the coupler 31 is positioned on arm 30 as shown in FIGS. 2-6, it is mounted in an opening, similar to openings 37, 39, and 41, that it is hidden from view by the coupler 31 itself.

Arm 30, having the flattened top portion, is formed of any suitable material, such as 0.75 inch diameter (19 mm) cold drawn steel. Similarly, arm 32 is a solid rod having a typical diameter of 9.5 mm (0.375 in.) and formed of a rigid material such as cold drawn steel.

Figure 7:
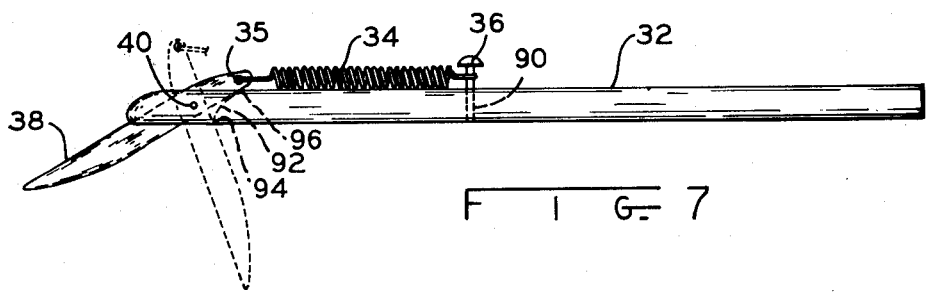
FIGS. 7 and 8 illustrate more details of the yieldable means shown in FIGS. 2-6.
Figure 8:
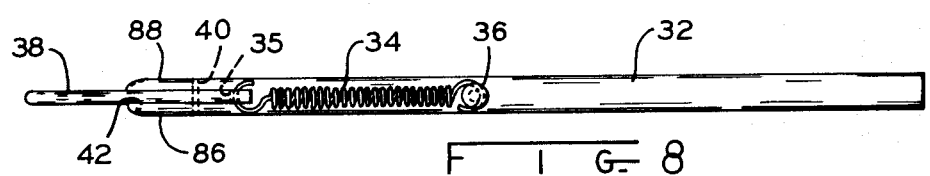

Arm 32, shown most clearly in FIG. 7, is interconnected with finger 38. From FIG. 7 it can be seen that the spring 34 is connected at one end to the arm 32 via a suitable screw 36 inserted into an opening 90 of arm 32 and the other end of spring 34 is positioned through an opening 35 of finger 38. Finger 38 is typically formed of a rigid material such as cold drawn steel and is inserted into a slot 42 of arm 32. Slot 42 is provided for by a spacing between side portions 86 and 88 shown in FIG. 8. Finger 38 is held within slot 42 by a pin 40 which is affixed to arm 32. Pin 40 serves as a fulcrum about which finger 38 pivots. Two positions of finger 38 are shown in FIG. 7, (1) a "normal" or "passive" position as represented by solid lines, and (2) a "biased" or "active" position shown in phantom. The degree of freedom with which finger 38 pivots is determined by the characteristics of spring 34. Spring 34 may typically be formed of spring steel and has an outer diameter of 4.75 mm (0.1875 in.), a wire diameter of 0.6 mm (0.025 in.) with 16 coils to the centimeter.

Reference is now made back to FIG. 2 to describe the positioning of the pivotal means 28 relative to the plurality of coils of a winding that is insertable into the slots of magnetic core 14. A winding coil group for the magnetic core 14 may typically comprise a plurality of coils with each coil comprising a number of turns. Shown in FIG. 2 is a winding coil group comprises of five coils 50, 56, 62, 68 and 74 which have been previously wound on the aforementioned cylindrical member of the coil transfer winder. Coils 50, 56, 62, 68 and 74 each have two end turn portions 52-54, 58-60, 64-66, 70-72, and 76-78 respectively. End turn portions 54, 60, 66, 72 and 78 are shown as dashed lines and are engaged within the previously mentioned non-retractable portion of the split stair-step cylindrical member 80 shown in FIG. 2. End turn portions 52, 58, 64, 70 and 76 have been previously wound on and released from the previously mentioned non-retractable portion of the split-stair-step cylindrical member. Member 80, which in effect comprises a coil transfer device carries coil end turn portions 54, 60, 66, 72 and 78 thereon, and moves the coils 50, 56, 62, 68 and 74 towards the magnetic core 14 for subsequent insertion of each of the coils 50, 56, 62, 68 and 74 into and along their respective axially extending slots of the magnetic core 14.

Pivotal means 28 is positioned to intercept one of the coils 50, 56, 62, 68 or 74 prior to the insertion of the coils 50, 56, 62, 68 and 74 into their respective slots of the magnetic core 14. The interception position of the finger 38 of pivotal means 28 is determined, in part, by the length of arm 30 extending from coupler 31, the length of finger 38 extending from slot 42 of arm 32, the position of the coupler 31 attached to arm 30, and the position 33 of pivotal means 28 attached to the cradle 22. The interception position of finger 38 is further determined by the relative angle between arms 30 and 32 and the relative angle between finger 38 and arm 32. The relative angle between arms 30 and 32 is determined by inserting a portion of arm 32 into the hole of coupler 31, affixing the portion of arm 32 to coupler 31 by tightening screw 133 of coupler 31, positioning the outer portion of arm 32 relative to arm 30 to establish the relative angle between the arms 30 and 32 and then affixing coupler 31 to arm 30 by tightening the screw located on the bottom portion of arm 30. The relative angle between finger 38 and arm 32 is determined by an internal channel 92 shown as dashed lines in FIG. 7, of arm 32. Channel 92 is located between bifurcated side portions 88 and 86, as best revealed in FIG. 8. With continued reference to FIG. 7, channel 92 has two ends 94 and 96 which determines the extent of movement of finger 38. End 94 determines the maximum extent of the pivotable movement (shown in phantom) of finger 38. End 96 determines the maximum extent at which the finger 38, represented by solid lines, recesses into the slot 42. The action of finger 38 of pivotal means 28 intercepting the end turn portion 76 of the coil 74 will be described with reference to FIGS. 2–6. The outer portion of finger 38 is positioned at a location to intercept a first conductor turn of the end turn portion 76 of coil 74 after the end turn portion 52 of coil 50 has contacted a curved baffle 44 mounted to cradle 22 via a suitable fastener 46. Baffle 44 is not essential to the practice of this invention, but it serves as a desirable means for guiding end turn portions 52, 58, 64, 70 and 76 towards their respective slots of magnetic core 14 for subsequent insertion. The guiding is accomplished by radially converging the end turns portions 52, 58, 64, 70 and 76 towards their respective slots of the supported magnetic core 14. From FIG. 2 it can be seen that finger 38 is positioned so that it will intercept one or more conductor turns of end turn portion 76 as end turn portion 76 is moved toward magnetic core 14.

The interception position of end turn portion 76 by finger 38 is shown in FIG. 3. Finger 38 intercepts one or more conductor turns of end turn portion 76 and the force of end turn portion 76 contacting finger 38 causes finger 38 to pivot about pin 40. From FIG. 4 it can be seen that finger 38 serves as a wedge or deflector increasing the separation between end turn portions 70 and 76 due to its pivoting action caused by the force of end turn portion 76 contacting finger 38. Also, from FIG. 4 it can be seen that the arrangement 84 of coils 50, 56, 62 and 68 is folded back in a direction toward coil 74. The folding action occurs due to the force of end turn portion 52 of coil 50 contacting baffle 44. The folding action of end turn portion 70 in a direction back towards end turn portion 76 in conjunction with the increase of separation between the end turn portions 70 and 76 by finger 38, allows end turn portion 76 to be slipped inside of end turn portion 70 as the end turn portions 70 and 76 are moved towards the magnetic core 14. An intermediate position of end turn portion 76 slipping inside of end turn portion 70 is shown in FIG. 5.

Figure 5:
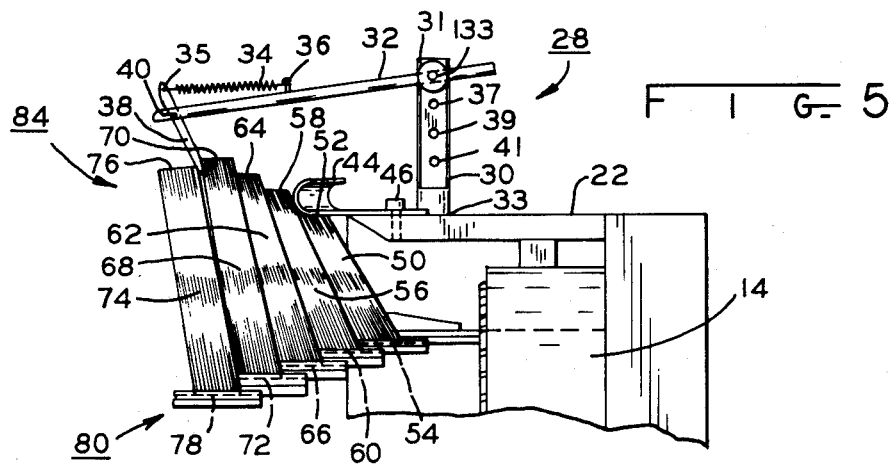
Figure 6:
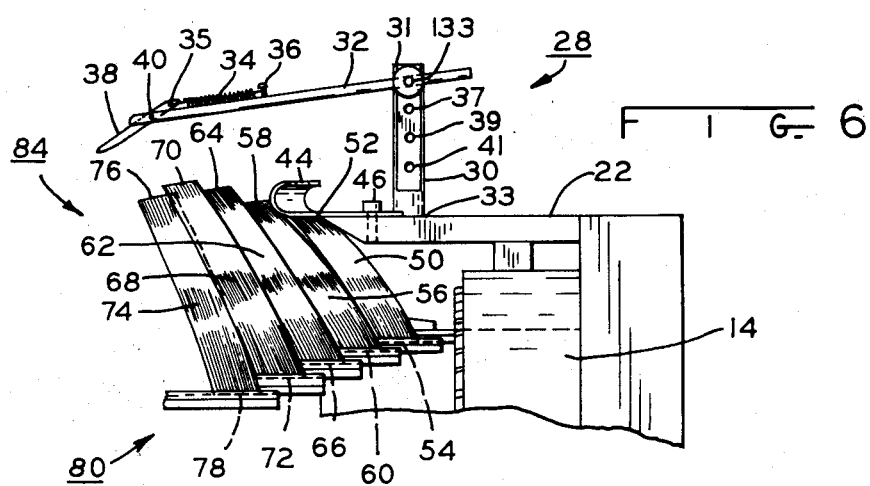

Finger 38 intercepting end turn portions 76 first causes a transition of the path of the leading conductor turns of end turn portion 76 from a position laterally outside of end turn portion 70 to a position laterally inside of end turn portion 70 (as best appreciated by comparing FIGS. 4, 5, and 6). As remaining portions of the conductor turns of end turn portion 76 disengage from finger 38, finger 38 positions these remaining portions of end turn 76 inside of the end turn 70. Upon completion of the movment of end turn portion 76 past finger 38, as shown in FIG. 6, end turn portion 76 is located inside of end turn portion 70. From FIG. 6 it can also be seen that finger 38 has become disengaged from end turn portion 76 and has been returned to its initial or non-pivoting position. The finger 38 is returned to its initial position by the action of spring 34.

It should now be appreciated that by positioning pivotal means 28 to intercept an end turn portion of a first coil that is not engaged by a coil transfer device and having a lateral position outside an end turn portion of a second coil that is also not engaged by the coil transfer device, the first coil may be positioned inside of the second coil by a coil deflecting means prior to the insertion of the first and second coils into their respective axially extending slots of a magnetic core.

The arrangement of the first coil positioned inside of the second coil prior to the insertion of the two coils into their respective slots of a magnetic core reduces an interengagement pressure between these two coils as the coils are inserted into and axially along their respective slots of the magnetic core. As discussed in the "Background" section of this patent application, the interengagement pressure between coils, such as the coil 74 which has a length longer than the coil 68, hinders the desired axial spacing of these coils axially along the magnetic core.

Figures 9, 10:
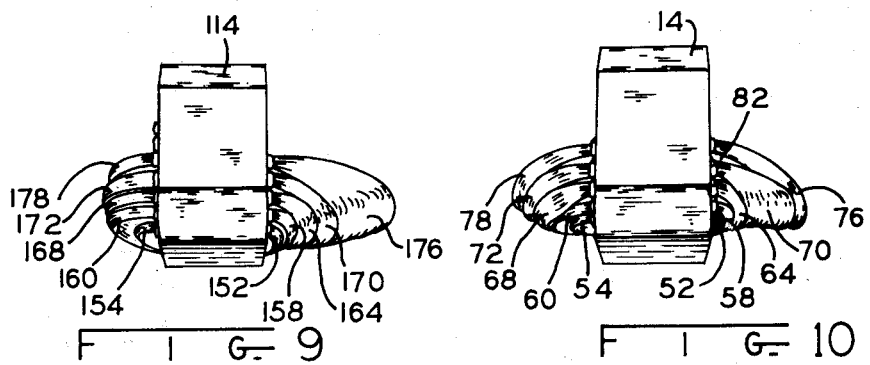
FIGS. 9 and 10 respectively show the axial location of the inserted coils with respect to magnetic cores when the coils have been placed according to prior art procedures and according to my new and novel procedures.

Reference is now made to FIGS. 9 and 10 to describe two separate relative locations of coils within the stator assembly. A first relative positioning, shown in FIG. 9, occurs when the coils are not prearranged prior to their insertion into slots of the magnetic core 114. A second relative positioning, shown in FIG. 10, occurs when the coils are prearranged prior to or during their insertion into slots of the magnetic core 14.

From FIG. 9 it can be seen that an end turn portion 176 inserted into the magnetic core 114 is draped over an end turn portion 170. This draping or overlapping of end turns 170 and 176 occurs because the end turn 170 of coil 168 is shorter than end turn portion 176 of coil 174, which causes coil 168 to pull against coil 174 as coil 168 is inserted into its respective slots of magnetic core 114.

From FIG. 10 it can be seen that the end turn portion 76, having been prearranged to be inside of end turn portion 70, lays inside of end turn 70. Also, it can be seen from FIG. 10 that there is a separation 82 between the end turns 76 and 70 at the location where the end turns 76 and 70 exit from the magnetic core 14.

A comparison between the relative positions of the coils shown in FIG. 9 and FIG. 10 reveals that the end turn portions 54, 60, 68, 72 and 78 shown in FIG. 10 exit from the magnetic core 14 a greater distance than an exit distance of end turn portions 154, 160, 168, 172, and 178 from magnetic core 114 shown in FIG. 9. In addition, it should be observed that the spacing of all the end turn portions 52–78 shown in FIG. 10 is more evenly spaced axially along the magnetic core 14 than the axial spacing shown in FIG. 9 of all the end turn portions 152–178 along magnetic core 114. In a still further comparison between the relative coil positions shown in FIGS. 9 and 10, it should be recognized that the relative coil positions shown in FIG. 10 allow the coils to be subsequently folded downward against the end faces of the stator core in a more even manner than is allowable by the distribution of the coils shown in FIGS. 9. Finally, it should be recognized from observing FIG. 10 that because of the substantial non-contact of end turn portions 76 and 78 these coils are permitted to be inserted further into stator slots and thereby allows for a longer slot separator wedge to be used. The longer slot separator wedge eliminates a manual action in which an operator normally replaces a relatively short slot separator wedge with a relatively longer slot separator wedge after the coils have been inserted into their stator slots.

It should now be appreciated that the invention that has thus been described provides for an improved axial spacing of the coils inserted into the stator core. Furthermore, the practice of this invention eliminates the need of an operator replacing a relative short slot separator wedge with a relatively longer slot separator after the coils have been inserted into the stator core.

Although the invention has been described for use with a device on which conductor turns for windings are wound for subsequent insertion, it should be recognized that a person skilled in the art will understand that the invention described herein may be utilized with inserting and or winding and inserting devices of types other than the specific type that has been discussed herein. Examples of such other types are shown for example in U.S. Pat. Nos. 3,324,536 (D. E. Hill), 3,831,225 (D. F. Smith et al.), 3,698,063 (D. F. Smith), and 3,829,953 (R. E. Lauer et al.) to name but a few, and the disclosures of all of which are incorporated herein by reference.

What I claim as new and desire to secure by Letters Patent of the United States is:

1. A method of transferring at least one winding, comprising a plurality of coils formed of a plurality of conductor turns, into axially extending slots of a stator assembly including a magnetic core having an axially extending bore and a pair of spaced apart end faces communicating with the axially extending slots and the bore, the method comprising:
   a. winding the plurality of conductor turns about a coil form to provide wound turns for a plurality of coils for subsequent insertion in respective axially extending slots of a magnetic core;
   b. releasing first portions of the plurality of wound turns while second portions of the plurality of wound turns remained engaged with the coil form and moving the wound turns toward the core for placement therein; and
   c. intercepting with a yieldable means the released first portion of the wound turns of a first coil having a position laterally outside of the wound turns of a released first portion of a second coil as the first and second coils are moved toward the core, and laterally displacing the released first portion of the first coil so that the intercepted released first portion of the first coil is displaced to a position laterally inside of the released first portion of the second coil;
   d. the displacing of the first portion of the first coil inside of the first portion of the second coil reducing an interengagement pressure between the first and second coils during placement of the first and second coils in the magnetic core.

2. A method of transferring at least one winding, comprising a plurality of concentric coils each of different sizes formed of a plurality of conductor turns and each having spaced apart end turn portions interconnected by side turn portions, from coil placing means into axially extending slots of a stator assembly including a magnetic core having an axially extending bore and a pair of spaced apart end faces communicating with the axially extending slots and the bore, the method comprising: holding a core in alignment with the coil placing means with all of the leading end turn portions aligned for axial passage through the bore of the core, with the trailing end portions disposed radially outwardly from an alignment position relative to the bore, and with the trailing end turn portions of the larger of the coils initially positioned radially outwardly of the trailing end turn portions of smaller ones of the coils; moving the plurality of coils in a direction to move the leading end turn portions of the coils axially with respect to the core; and yieldably intercepting and engaging the trailing end turn portion of a larger first one of the coils and deflecting the end turn portion so engaged radially inwardly with respect to the bore and the end turn portion of a smaller one of the coils adjacent to the first one of the coils so that the intercepted end turn portion is positioned radially inwardly of the end turn portion of the smaller one of the coils during the insertion process.

3. The method of claim 2 wherein intercepting and engaging the trailing end turn portion of the larger first one of the coils at least reduces interengagement pressure between the larger first one of the coils and the smaller one of the coils adjacent to the first one of the coils.

4. Apparatus for placing at least one winding comprising a plurality of coils formed of a plurality of conductor turns in axially extending slots of a stator assembly, said stator assembly including a magnetic core having an axially extending bore and a pair of spaced apart end faces communicating with the axially extending slot and the bore; the apparatus comprising: coil placing means for supporting a plurality of concentric coils of different sizes with leading end turn portions of the coils confined by the coil placing means and trailing end turn portions of the coils extending laterally from the coil placing means; means for intercepting and deflecting the trailing end turn portion of a first coil in a direction toward the coil placing means so that the intercepted portion of the first coil is displaced to a position laterally between the end turn portion of a second smaller coil and the coil placing means thereby to reduce an interengagement pressure between the first and second coils during a coil placing operation.

5. Apparatus for transferring at least one winding comprising a plurality of coils formed of a plurality of conductor turns into axially extending slots of a stator assembly, said stator assembly including a magnetic core having an axially extending bore and a pair of spaced apart end faces communicating with the axially extending slots and the bore; the apparatus comprising:
   a. means for supporting a magnetic core;
   b. form means for cooperating in the formation of a plurality of conductor turns for a plurality of coils for a magnetic core, said form means being operable for releasing at least a portion of each of the plurality of the wound coils; and
   c. yieldable means for intercepting a released portion of a first coil of said plurality of coils and for engaging and moving the released portion of the first coil to a position laterally inside of the released portion of a second coil.

6. A device for positioning at least one winding, prior to the insertion of the winding into axially extending slots of a dynamoelectric machine core having an axially extending bore, wherein the winding comprises a plurality of coils having a plurality of conductor turns, the device comprising: means for placing a plurality of coils on a core; and yieldable means for intercepting a portion of a first coil while it is being placed on a core and laterally repositioning the intercepted portion of the first coil relative to a second coil.

7. The device of claim 6 wherein the yieldable means comprises a plurality of arms, a pivotal finger and tension means, said plurality of arms including first and second arms, said first arm having a first end coupled at a first predetermined location to a supporting structure and a second end adjustably coupled to a first portion of said second arm at a second predetermined location, said second arm having a second portion coupled to said pivotal finger and another portion thereof connected to the tension means, the tension means also being connected to the pivotal finger; said pivotal finger extending from the second portion of the second arm a predetermined distance and being positionable to a coil interception point.

* * * * *